June 23, 1942.  E. D. LILJA  2,287,045

CONTROL APPARATUS

Filed Sept. 12, 1939  2 Sheets-Sheet 1

INVENTOR
Edgar D. Lilja
BY
Parker, Carlson, Pitzner & Hubbard
ATTORNEYS

June 23, 1942.  E. D. LILJA  2,287,045
CONTROL APPARATUS
Filed Sept. 12, 1939  2 Sheets-Sheet 2

INVENTOR
Edgar D. Lilja
BY
Parker, Carlson, Pitzner & Hubbard
ATTORNEYS

Patented June 23, 1942

2,287,045

UNITED STATES PATENT OFFICE 2,287,045

CONTROL APPARATUS

Edgar D. Lilja, Rockford, Ill., assignor to Barber-Colman Company, Rockford, Ill., a corporation of Illinois Application September 12, 1938, Serial No. 229,559

12 Claims. (Cl. 236—74)

This invention relates generally to automatic apparatus for governing a condition, as a chemical, physical, or electrical condition, by modulating the position of a regulating member such as a valve, a damper, a rheostat, a speed changer, or the like. More particularly the invention relates to controls of the character in which a primary response occurs in proportion to the degree of deviation of the controlled condition from the value desired to be maintained and is followed by a slow secondary response causing sufficient further correcting movement of the regulating member to effect complete restoration of the controlled condition to the desired value.

The primary object of the invention is to provide a novel control of the above character which is simple and inexpensive in construction, which is reliable in operation, which enables the control condition to be maintained with a high degree of uniformity, and which permits the mechanism for producing the secondary response above referred to be located remotely from the condition responsive means as well as the regulating member.

Another object is to provide a resetting-proportioning control having means which acts uniformly and with extreme sensitivity in initiating and producing the secondary response of the regulating member.

A further object is to provide such a control in which the proportioning and resetting actions are produced through the medium of a relay, the balance of which is upset mechanically in response to detected condition deviations.

The invention also resides in the novel character of the mechanism for controlling the secondary or restoring movement of the regulating member.

Other objects and advantages of the invention will become apparent from the following detailed description taken in connection with the accompanying drawings, in which—

Figure 1:
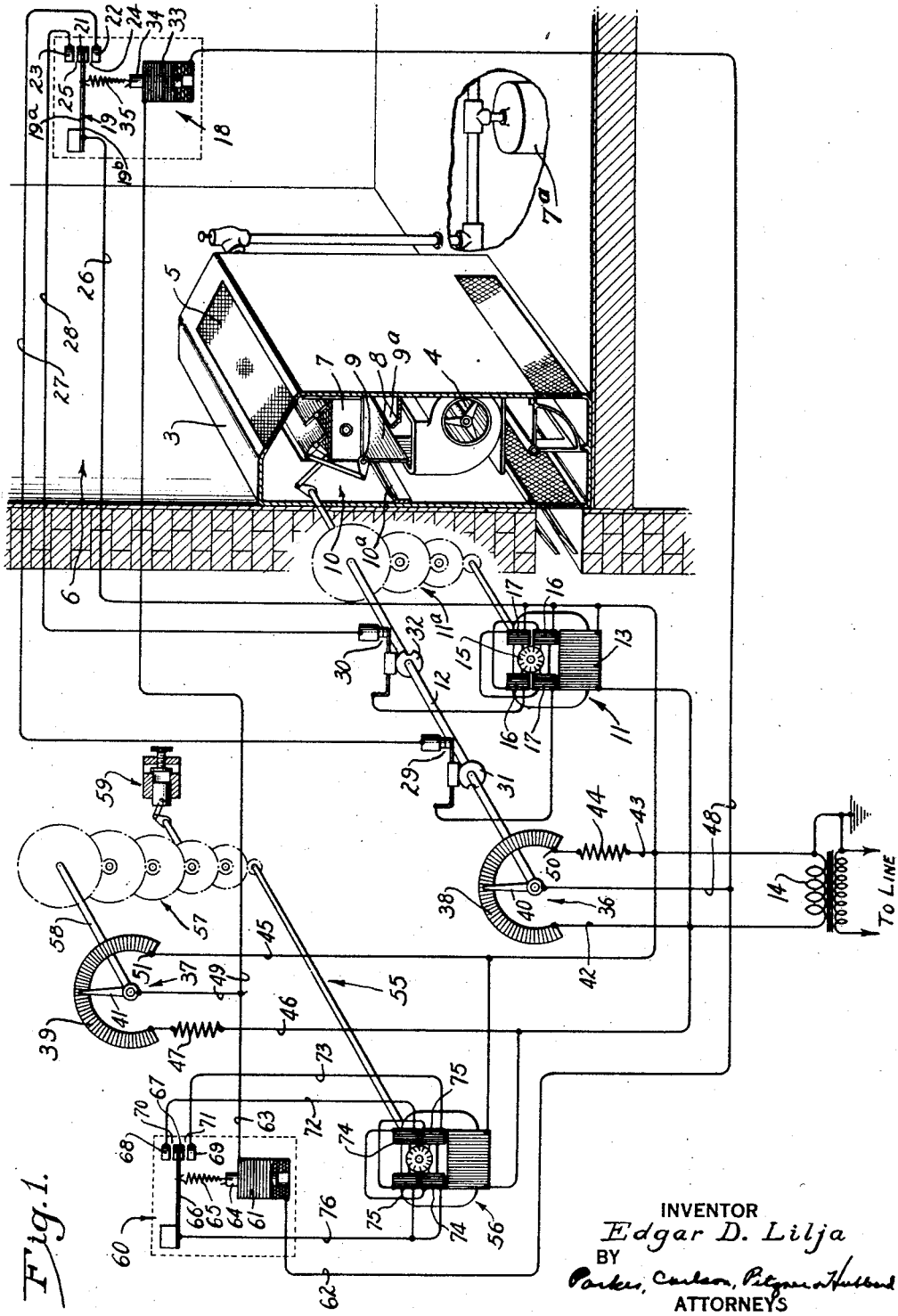
Figure 1 is a schematic view and wiring diagram of a control embodying the present invention.

The invention is applicable to the control of various kinds of regulating members for maintaining a wide variety of conditions. For convenience of illustration, however, the invention is shown in the drawings and will be described as applied to the control of one typical form of temperature changer for maintaining a uniform temperature in a space to be conditioned. I do not intend to limit the invention by such exemplary disclosure but aim to cover all modifications and alternative constructions and uses falling within the spirit and scope of the invention as expressed in the appended claims.

Referring first to Fig. 1, the temperature changer shown is a heater of the so-called unit ventilator type comprising a casing 3 through which fresh or recirculated air or a mixture of both is drawn by a power driven blower 4 and discharged from the casing outlet 5 into the room or space 6 to be conditioned after all or part of the air has passed over an exchanger in the form of a heating radiator 7 containing suitable heated fluid supplied from a source 7ª.

The proportion of the air current subjected to the heating coil is determined by the position of a regulating member in the form of a damper 8 pivoted at 9 and swingable from the full-cooling position against a stop 9ª in which all of the air is diverted around the coil 7 through a by-passage 10 to a full-heating position against a stop 10ª in which all of the air is directed through the coil. Thus, the conditioning capacity of the heating apparatus and therefore the temperature of the delivered air will vary progressively with changes in the position of the damper.

Herein, the damper is arranged to be oscillated varying distances back and forth with a graduated movement by a reversible power driven operator herein shown as comprising an electric motor 11 operating through speed-reduction gearing 11ª to drive a main operating shaft 12 connected by suitable cranks and links to the damper pivot. Preferably, the motor is of the shaded pole induction type having a winding 13 constantly energized from a low voltage source 14 of alternating current and a rotor 15 arranged to turn clockwise and counter-clockwise respectively according to which of two sets of shading coils 16 and 17 is short-circuited, the rotor remaining idle when both sets are open-circuited.

The means for detecting deviations in the condition being controlled, that is, the space temperature, from the value desired to be maintained, comprises in the present instance a thermostat 18 preferably of the simple double switch type such as is commonly used in electrical control systems of the floating type. The temperature responsive element 19 of the thermostat comprises two strips 19ª and 19ᵇ of metal having different coefficients of expansion and joined together so as to warp in opposite directions with opposite changes in the ambient temperature. The element is supported from one end and carries at its other end a contact 21 movable between two limit positions against stationary contacts 22 and 23 and cooperating therewith to form two switches 24 and 25. The contact 21 is connected by a conductor 26 to the common terminal of the shading coils, and conductors 27 and 28 extend from the contacts 22 and 23 through limit switches 29 and 30 to the insulated terminals of the coils 16 and 17. The limit switches 29 and 30 are opened by cams 31 and 32 on the shaft 12 in the full-cooling and full-heating positions of the damper 8. Preferably, the contacts 22 and 23 are spaced as close together as is practicable while at the same time maintaining clearance between the cooperating switch contacts in the neutral position of the tongue in which both switches are open.

When the temperature of the thermostatic element falls below the prevailing control point for which the thermostat is set to respond, the contact 21 moves to heat-increasing position against the contact 23 and closure of the switch 25 short-circuits the shading coils 16 whereupon movement of the damper 8 toward full-heating position is initiated. This movement continues until the switch 25 or the limit switch 30 opens after which the position of the damper will remain fixed so long as the thermostat tongue remains in the neutral position shown with both switches open. Movement of the tongue 19 to heat-decreasing position against the contact 22 as a result of a rise in temperature above the prevailing control point closes the switch 24. This short-circuits the coils 17 and causes the motor to operate in a direction to increase the proportion of the air by-passed around the heating coil.

The invention contemplates a primary response of the control which will change the position of the regulating member or damper 8 to correspond with the changed value of the room temperature. Such true proportioning action is preferably effected through the provision of means for varying the effective control point of the room thermostat 18 through a comparatively narrow temperature range pregressively and preferably substantially instantaneously with changes in the position of the regulating member. In the present instance, this means comprises an adjusting relay including a magnet 33 of the solenoid type mounted adjacent but insulated from the thermostat and having an armature 34 connected through the medium of a contractile spring 35 to the tongue 19 of the thermostat. The solenoid exerts on the tongue a light mechanical force determined by its degree of energization and acting to vary the control point of the thermostat, that is to say, to cause the thermostat tongue 19 to be disposed between the contacts 22 and 23 at different ambient temperatures. Otherwise stated, the thermostat and the solenoid constitute a magnetic relay which is balanced when the contact 21 stands between the contacts 22 and 23. It may be unbalanced or rebalanced electrically by varying the degree of energization of the solenoid. Or the relay may be unbalanced mechanically by the condition responsive means or bimetallic strip 19. Thus, in this instance, the variable force resulting from warping of the strip with abient temperature changes is applied directly to the relay contact 21.

The solenoid 33 is maintained energized continuously during operation of the heating system and the degree of energization is governed, in the present instance, by the combined action of two independently operable potential dividing rheostats 36 and 37. These comprise resistance elements 38 and 39 respectively engaged by wiper arms 40 and 41, the former being fast on the shaft 12 so as to be moved in unison with the damper 8. The terminals of the resistance 38 are connected to the current source 14 by conductors 42 and 43, the latter including a fixed resistance 44. Conductors 45 and 46, the latter including a fixed resistance 47, connect the terminals of the resistance 39 to the current source. The wiper arms 40 and 41 are connected to opposite terminals of the solenoid winding 33 by conductors 48 and 49.

With the above arrangement, the voltage impressed on the solenoid at any time may be considered as the line voltage minus the drop in voltage across the resistance 38 from the conductor 42 to the arm 40 and through the resistance 39 from wiper arm 41 to drop across the resistance 39 between the arm 41 and the terminal 51. Assuming that the arm 41 remains stationary, the voltage impressed on the solenoid 33 will increase progressively as the arm 40 wipes across the resistance 38 during counterclockwise rotation of the damper operating shaft 12 in response to short-circuiting of the shading coils 16 by closure of the thermostat switch 25. The resulting increase in the force exerted by the solenoid imposes more and more tension on the thermostatic element resulting in a corresponding lowering of the thermostat control point. Similarly, the energizing current decreases progressively as the shaft 12 turns clockwise as it will while the thermostat switch 24 is closed and the shading coils 17 short-circuited.

As a result of the automatic adjustment of the thermostat control point in the manner above described, the damper 8 will assume a different equilibrium position for each different room temperature. The value of the resistance 38 is coordinated with the construction of the solenoid and thermostatic element in a manner such that the range through which the control point of the thermostat will be shifted in the movement of the rheostat arm as the damper moves throughout its range will be as small as practicable without the attendant danger of producing objectionable hunting of the damper in the establishment of its equilibrium positions under different operating conditions. In systems of the character shown, this range may, for example, be approximately three degrees.

As an incident to repositioning of the regulating member in proportion to a deviation of the controlled condition from the desired value or so long as the controlled condition deviates from a predetermined desired value, the operation of mechanism is initiated to produce the secondary response of the control, that is, to cause enough further movement of the regulating member to restore the controlled condition to the desired or balanced value. Herein, this mechanism is structurally separate and mechanically disconnected from the damper operator and the thermostat 18 and operates to actuate the rheostat 37 in a manner such as to shift the control point of the thermostat in a direction reverse to and at a rate substantially slower than that resulting from movement of the damper. Such readjustment continues until, for the changed position of the regulating device, the thermostat control point has been restored precisely to a fixed value corresponding to the temperature condition desired to be maintained in the space being heated.

Preferably, such slow actuation of the rheostat 37 is effected by a motor driven operator 55 comprising a reversible shaded pole induction motor 56 of the same construction as the motor 11 and connected through appropriate speed reduction gearing 57 to a shaft 58 on which the wiper arm 41 is fast. By proportioning the gearing 57 or by adjustment of a fluid pump 59 driven by the motor 56, the speed of the latter may be adjusted so that the shaft 58 operates at only a fraction, for example, one-tenth, of the speed of the damper operating shaft 12.

The motor 56 is controlled by a balanced magnetic relay 60 comprising a solenoid 61 similar in construction to the solenoid 33 and having a winding connected by conductors 62 and 63 to the conductors 48 and 49. The solenoid is thus interposed in parallel with the solenoid 33. The armature 64 of the solenoid is joined through a conical contractile spring 65 to a leaf spring 66 anchored at one end and carrying a contact 67 at its free end cooperating with contacts 68 and 69 to form two switches 70 and 71. Conductors 72 and 73 connect the contacts 68 and 69 to the insulated terminals of the shading coils 74 and 75 while the common terminals of the latter are connected to the spring tongue 66 by a conductor 76. The arrangement is such that when the switch 70 is closed, the coils 74 are short-circuited and the motor operated in a direction to swing the arm 41 clockwise thereby increasing the voltage applied to the solenoids 33 and 61. Reverse movement of the arm and a decrease in voltage occurs when the coils 75 are short-circuited by closure of the switch 71. When the prevailing pull of the solenoid 61 is just balanced against the tension of the spring 66, the contact 67 stands in mid-position, both switches then being open and the motor 56 idle.

Being in parallel, the solenoids 33 and 61 are always energized to the same degree determined by the combined condition of the rheostats 36 and 37. The adjustment of the relay 60 is such that it is balanced when energized by a current of the magnitude required to maintain the thermostat 18 balanced when the controlled condition, that is, the air temperature around the thermostatic element 19, is at its value desired to be maintained. In other words, the relay 60 operates to detect deviations in the thermostat control point from its normal or desired value, and to close the switches 70 and 71 selectively when such point rises above and falls below such value. The operation of the motor 56 resulting from such switch closure is in a direction such as to cause the rheostat 37 to restore the desired normal control point of the thermostat.

It will be observed that the power operator 55, the rheostat 37, and the relay 60 are mechanically disconnected from the damper operator and the control instrument including the adjusting relay 33. All of the connections between these elements are electrical which permits them to be located remote from each other as may be required by the characteristics of the installation in which they are used.

In explaining the operation of the control above described, it will be assumed that the controlled condition desired to be maintained is a space temperature of 70 degrees and that the thermostat 18 is so set. When the space temperature falls below 70 degrees, the tongue 19 warps upwardly and closes the switch 25 which short-circuits the shading coils 16 causing the motor 11 to run in a clockwise direction. The shaft 12 is turned counter-clockwise moving the damper 8 toward full-heating position. The simultaneous movement of the wiper arm 40 results in an increase in the voltage impressed on the solenoid 33 and a corresponding increase in the solenoid pull, causing the switch 25 to open and stop the motor 11 when the damper has moved through a distance proportional to the amount the room temperature has fallen below 70 degrees.

The increased excitation of the solenoid 61 which occurs simultaneously with that of the solenoid 33 results in closure of the switch 71 which short-circuits the shading coils 75 causing the motor 56 to run in a clockwise direction turning the wiper arm 41 of the rheostat 37 counter-clockwise at a comparatively slow rate. Such movement is accompanied by a slow decrease in the voltage impressed on the windings 33 and 61, and this decrease continues until the motor 56 is stopped by opening of the switch 71 when the relay again becomes balanced. At this time, the control point of the thermostat 18 will have been restored fully to its normal value.

As an incident to such full restoration, the thermostat normally will, due to raising of the control point by the action of the rheostat 37, close its switch 25 thereby initiating further movement of the damper in the heat-increasing direction and a corresponding increase in the energizing current. The cycle may be repeated several times in the course of the secondary response or restoring action until finally the capacity of the heater will have been increased sufficiently to bring the room temperature back to normal.

When the room temperature rises above normal, the switch 24 is closed short-circuiting the other shading coils 17 and driving the damper 8 in the heat-decreasing direction. At the same time, the slider 40 is moved clockwise which correspondingly decreases the solenoid voltage. The decreased pull of the solenoid 33 raises the effective thermostat control point so that the damper movement is interrupted at a position corresponding to the magnitude of the temperature deviation. The decreased energization of the relay 60 causes closure of the switch 70 and short-circuiting of the coils 74 resulting in clockwise movement of the rheostat arm 41. During the ensuing slow restoration of the solenoid voltages to normal, the damper may, due to continued high room temperature, be moved intermittently in the heat-decreasing direction, the direction of change in the solenoid energization being reversed under the control of the rheostat 36 during such movements. Finally, when the balanced condition of both the relay 33, 34, 35 and the relay 60 has been restored following lowering of the room temperature to the desired value, operation of both motors 11 and 56 will be arrested, the system remaining balanced until the room temperature again deviates from normal.

As a result of the primary or proportioning action and the secondary or restoring action described above, the regulating member or damper will, in response to a deviation of the controlled condition from normal, quickly assume a new position which is a function of the deviation. Then, in response to the secondary action, the damper will move slowly to a further position at which the conditioning capacity of the apparatus is just sufficient to maintain the desired normal condition. As a result of the primary response, the possibility of hunting will be eliminated while the secondary response overcomes the shift in the control point of the condition-responsive instrument which shift is an objectionable characteristic inherent in true proportioning systems.

Figure 2:
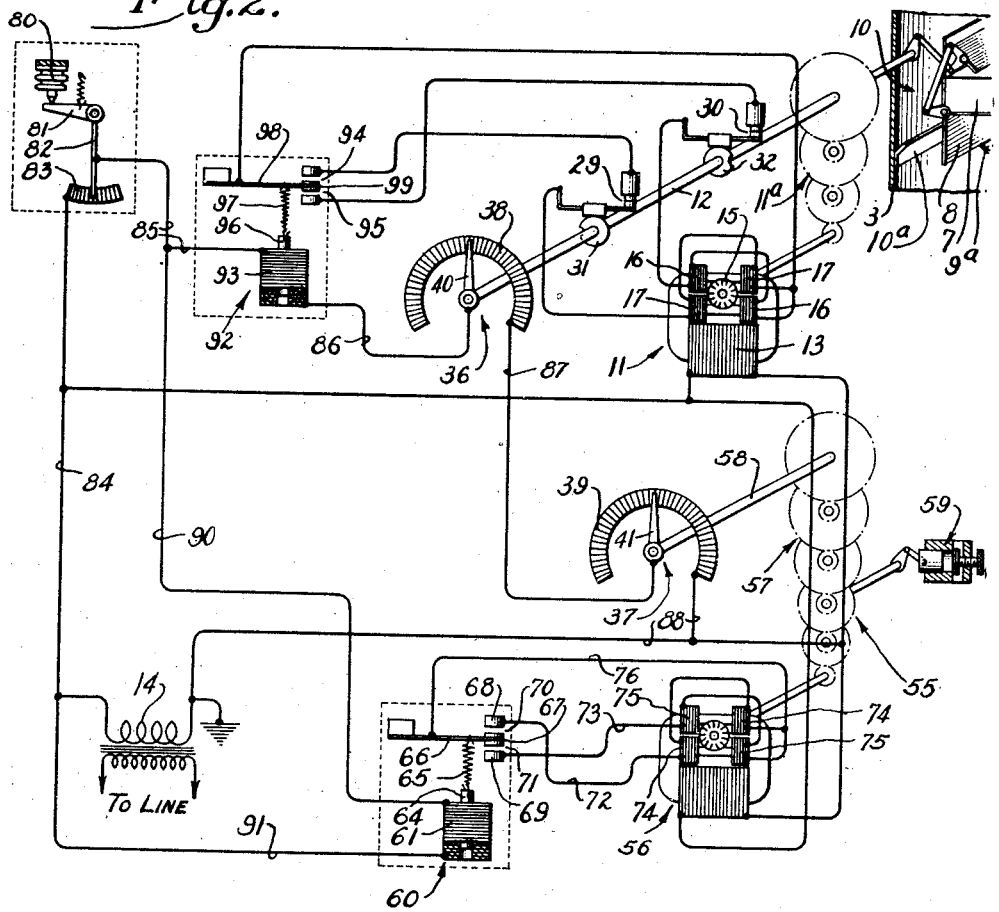
Fig. 2 is a similar view of a modified form of the control.

Fig. 2 shows an adaptation of the improved control to a system controlled by a so-called potentiometer type of condition responsive device. To simplify the description of this system, the parts common to the system shown in Fig. 1 are indicated by the same reference numbers.

In the modified system, the condition responsive device comprises a thermostatic bellows 80 operating an arm 81 to swing a wiper arm 82 across a resistance element 83. This element and the arm 83 constitute a rheostat acting jointly with the rheostats 36 and 37 to control the energization of a balanced relay 92 having switches 94 and 95 which control the windings 17 and 16 of the damper operator in the same way as the switches 24 and 25 in the preferred form of the invention shown in Fig. 1. The relay 92 is of the same construction as the relay 60 comprising a solenoid 93 having an armature 96 connected by a spring 97 to a leaf spring 98 which carries the common contact 99 of the switches 94 and 95.

The energizing circuit for the solenoid 93 extends from the current source 14 through a conductor 84, part of the element 83, the arm 82, a conductor 85, the solenoid winding 93, a conductor 86, wiper arm 40, part of resistance element 38, a conductor 87, wiper arm 41, a part of element 39, and a conductor 88. The thermostat rheostat also controls the energization of the relay 60 independently of the rheostats 36 and 37 and to this end the winding 61 is joined by conductors 90 and 91 to the conductor 85 and to one terminal of the current source.

In operation of the modified system, the thermostatic bellows contracts on a fall in the room temperature and moves the arm 82 clockwise thereby reducing the effective resistance of the solenoid circuits. The resulting increase in the current energizing the solenoid winding 93 causes the switch 95 to close. This short-circuits the coils 16 of the motor 11 turning the shaft 12 counter-clockwise and increasing the rate of heat delivery. The simultaneous movement of the rheostat arm 40 increases the resistance and decreases the current in the circuit of the solenoid winding 93. The damper motor continues to run until the current in the relay 92 has returned to normal whereupon the switch 95 opens. Since the movement of the rheostat arm 40 is proportional to the movement of the thermostat arm 82, the initial damper movement will be proportional to the degree of deviation of the temperature from normal.

The reduction in the effective resistance of the rheostat element 83 incident to the room temperature drop above assumed lowers the voltage applied to the relay winding 61 and causes the switch 70 to close, short-circuiting the shading coils 74. The resetting motor 56 is started and drives the rheostat arm 41 slowly in a clockwise direction. This causes the current in the relay winding 93 to increase slowly as long as the room temperature is below normal. Because of this action, the relay switch 95 may close again causing the damper operator to increase the heat supply further and again move the rheostat 36 in a direction to reduce the current in the winding 93 and reopen the switch 95. This action may be repeated several times in response to actuation of the rheostats 36 and 37 before normal room temperature is attained.

Now, if the room temperature rises above normal, the bellows 80 will expand and increase the effective resistance of the solenoid circuits. This in turn will cause the switch 94 to close and the motor 11 will drive the damper in the heat-decreasing direction during which the current in the winding 93 is increased by the rheostat 36. As before, the initial movement of the damper will be proportional to the temperature departure from the normal balanced value.

The movement just referred to of the thermostat arm 82 also increases the voltage impressed on the solenoid winding 61 causing closure of the switch 71 and operation of the motor 56 to drive the rheostat arm 41 slowly in a counter-clockwise direction. This decreases the current in the solenoid 93 as long as the room temperature remains above normal and results in intermittent movement of the faster operating damper actuator until the temperature is reduced to normal. From the foregoing, it will be seen that the modified form of control produces the desired primary response or proportioning action followed by a secondary or resetting action the same as the control shown in Fig. 1.

I claim as my invention:

1. In a system of the character described, the combination of two independently operable voltage regulators, two reversible power operators for actuating the respective regulators at different speeds, balanced magnetic relays individually controlling the respective operators and having windings each controlled by the combined condition of said regulators, condition responsive means controlling the balance of the one relay, and condition regulating apparatus actuated by the operator controlled by the last mentioned relay.

2. In a system for maintaining a uniform condition, the combination of a regulating member movable to modulate said condition, a reversible power driven operator for actuating said member, a magnetic relay, control means for said operator responsive to changes in said condition and in the energization of said relay, a voltage regulator actuated in unison with said member and controlling the energization of said relay, an independent magnetic relay variably energized in accordance with changes in the energization of said first relay, means controlled by said second relay and operating in response to a deviation in the energization of said first relay from a predetermined normal value to cause restoration of the energization of the first relay to such normal value at a rate substantially slower than the rate of change of energization of the first relay in response to changes in the position of said member.

3. In a system for maintaining a uniform condition, the combination of a regulating member movable to modulate said condition, a reversible power driven operator for actuating said member, a magnetic relay, control means for said operator responsive to changes in said condition and in the energization of said relay, a voltage regulator actuated in unison with said member and controlling the energization of said relay, a magnetic relay variably energized in accordance with changes in the energization of said first relay, means controlled by said second relay operating in response to a deviation in the energization of said first relay from a predetermined normal value to restore the energization to such normal value at a rate substantially slower than the rate of change of energization of the first relay in response to changes in the position of said member, said second relay and said last mentioned means constituting a unit structurally separate from said operator and first relay but associated therewith through electrical connections.

4. In a system for maintaining a uniform condition, the combination of a regulating member movable to modulate said condition, two magnetic windings, switching means controlled by one of said windings and also responsive to changes in said condition, a power driven operator controlled by said switching means to cause condition-increasing and condition-decreasing movements of said member in response to opposite changes in the position of said switching means from a normal balanced position, two voltage regulators each controlling the energization of said windings, one of said regulators being movable in unison with said member to restore the balanced position of said switching means following a change in said condition, a second reversible power operator for actuating the second voltage regulator to change the energization of said windings at a slower rate than said first regulator, and switching means controlled by said second winding and operable to cause operation of said second operator in opposite directions with opposite deviations in the energization of the second winding from a predetermined balanced value, the direction of variation of the second operator being such as to restore the balanced condition of said second switching means.

5. In a system for maintaining a uniform condition, the combination of conditioning apparatus including a regulating member movable back and forth to increase and decrease said condition, an instrument controlling said member to cause condition-increasing and condition-decreasing movements thereof when said condition falls below and rises above the control point of said instrument, a magnet operatively associated with said instrument and acting to vary the control point of the instrument to correspond to the degree of energization of the magnet, two structurally separate and mechanically disconnected voltage regulating means governing the energization of said magnet and each having a control element movable to vary the energization of said magnet, means for operating one of said elements in unison with the movements of said member, an independently operable electric motor arranged to operate the other of said control elements at a speed substantially slower than the speed of actuation of the first control element, and means mechanically disconnected from said magnet and said member for causing operation of said motor in opposite directions in response to opposite deviations in the energization of said magnet away from a predetermined balanced value.

6. In a system for maintaining a uniform condition, the combination of a regulating member movable back and forth to increase and decrease said condition, an instrument controlling said member to cause condition-increasing and condition-decreasing movements thereof when said condition falls below and rises above the control point of the instrument, a magnet operatively associated with said instrument and varying the control point thereof to correspond to the degree of magnet energization, two independently operable voltage regulators controlling the energization of said magnet, one of said regulators being actuated in unison with the movements of said member, a reversible power driven operator for actuating said other voltage regulator at a slower rate than the first regulator, a balanced magnetic relay in parallel with said magnet and controlled by said regulators, and means actuated by said relay and controlling the direction and extent of operation of said operator to restore a predetermined normal degree of energization of said magnet and relay.

7. The combination of three rheostats connected in series relation, condition responsive means actuating one of said rheostats, relatively slow and fast operating reversible operators respectively actuating the other rheostats, a regulating device actuated by said fast operator, a magnetic relay controlling the fast operator and controlled by the joint action of said rheostats, and a second magnetic relay controlled only by the condition actuated rheostat.

8. The combination of a reversible power operator having a driven member adapted for actuation of conditioning apparatus, a normally electrically balanced mechanism responsive to changes in a condition to be controlled by said apparatus and controlling said operator to modulate the position of said member and in proportion to changes of said condition, a second reversible power operator controlling the balance of said mechanism to produce a slow resetting action, an electric circuit governing the direction and extent of operation of said second operator including two independent voltage regulators respectively actuated by said first and second operators.

9. The combination of a reversible power operator having a driven member adapted for actuating conditioning apparatus, a normally balanced magnetic relay governing the selective operation of said operator in accordance with the direction of unbalance of the relay, means adapted to detect changes in a condition controlled by said apparatus and acting mechanically on said relay to unbalance the same in accordance with each condition change, electrical means actuated by said operator to rebalance the relay and proportion the movements of said member in accordance with each condition change, a second electrical means controlling the balance of said relay, and a reversible power actuator operating said second electrical means during the persistence of a deviation in said condition from a predetermined value to slowly unbalance said relay in a direction determined by the condition change.

10. The combination of a reversible power operator having a driven member adapted for actuation of conditioning apparatus, a normally balanced magnetic relay governing the selective operation of said operator in accordance with the direction of unbalance of the relay, means adapted to detect changes in a condition controlled by said apparatus and acting mechanically on said relay to unbalance the same in proportion to each condition change, electrical means actuated by said operator to rebalance the relay, a reversible power actuator operating during the persistence of a deviation in said condition from a predetermined value, and means operated by said actuator following unbalance of the relay by a condition change to further unbalance the relay at a slow rate and cause secondary positioning of said member to restore the condition to said predetermined value.

11. The combination of a reversible electric motor operator having a driven member adapted for connection to a condition regulating device, a normally balanced magnetic relay having a movable element and switch means actuated selectively by the element in accordance with the direction of movement of the element away from a neutral position, said operator being controlled by said switch means in accordance with the direction of unbalance of the relay and being idle when said element is in said neutral position, means adapted to detect changes in a controlled condition and acting mechanically on said element to unbalance the relay in proportion to each condition change, means actuated by said operator and acting electrically on said relay to rebalance the same, and means operating during the persistence of a deviation in said condition from a predetermined value following unbalance of the relay in response to a condition change to further unbalance the relay at a slow rate and cause secondary positioning of said member until the condition has been restored to said predetermined value.

12. The combination of a reversible power operator having a driven member adapted for connection to a condition regulating device, a normally balanced magnetic relay having a movable element spring biased in one direction and a magnet continuously energized and urging the element in the opposite direction to counteract the effect of the bias, control means responsive to movements of said element in opposite directions and governing the selective operation of said operator in accordance with the direction of unbalance of the relay, means adapted to detect condition changes and acting mechanically to vary the force applied to said element to unbalance the same in the direction of and in proportion to each condition change, means actuated in the ensuing operation of said operator to rebalance the relay, and independently acting power actuated means operating during the persistence of a deviation in said condition from a predetermined value to further unbalance the relay at a slow rate and continue such unbalancing until the condition has been restored to said predetermined value.

EDGAR D. LILJA.